US00RE40125E

(19) United States
(12) Reissued Patent
Matthews et al.

(10) Patent Number: US RE40,125 E
(45) Date of Reissued Patent: Mar. 4, 2008

(54) BATTERY OPERATED APPLIANCE, FLASHLIGHT AND SWITCHING SYSTEMS

(75) Inventors: John Wallace Matthews, Newport Beach, CA (US); Paul Youngcho Kim, Irvine, CA (US)

(73) Assignee: Surefire, LLC, Fountain Valley, CA (US)

(21) Appl. No.: 10/357,724

(22) Filed: Feb. 3, 2003

Related U.S. Patent Documents

Reissue of:
(64) Patent No.: 6,222,138
Issued: Apr. 24, 2001
Appl. No.: 09/483,311
Filed: Jan. 14, 2000

U.S. Applications:
(62) Division of application No. 08/985,556, filed on Dec. 5, 1997, now Pat. No. 6,046,572.

(51) Int. Cl.
*H01H 9/20* (2006.01)

(52) U.S. Cl. ..... 200/4; 200/60; 200/43.13; 200/315; 200/321

(58) Field of Classification Search ..... 200/4, 200/6 R, 17 R, 43.11–43.13, 60, 520, 526, 200/527, 564, 566, 567, 570, 572, 573, 318–318.2, 200/321, 327, 329, 331, 341
See application file for complete search history.

(56) References Cited

U.S. PATENT DOCUMENTS

| | | | | | |
|---|---|---|---|---|---|
| 1,513,437 | A | * | 10/1924 | Voorhees | 200/60 |
| 1,598,666 | A | * | 9/1926 | Voorhees | 200/60 |
| 2,752,411 | A | * | 6/1956 | Frank | 200/44 |
| 2,752,441 | A | * | 6/1956 | Frank | 200/43.13 |
| 3,345,489 | A | * | 10/1967 | Kemnitz | 200/318.2 |
| 3,652,846 | A | * | 3/1972 | Starck, II | 362/263 |
| 3,711,699 | A | * | 1/1973 | Bacevius | 362/189 |
| 3,743,915 | A | * | 7/1973 | Struck | 320/127 |
| 4,000,403 | A | * | 12/1976 | Rice | 362/370 |
| 4,025,743 | A | * | 5/1977 | Oswald | 200/60 |
| 4,250,446 | A | * | 2/1981 | Ponte | 324/506 |
| 4,504,889 | A | * | 3/1985 | Goldfarb | 362/200 |
| 4,905,129 | A | * | 2/1990 | Sharrah | 362/158 |
| 4,984,140 | A | * | 1/1991 | Ellion | 362/187 |
| 5,043,546 | A | * | 8/1991 | Krause | 200/527 |
| 5,091,611 | A | * | 2/1992 | Reeves et al. | 200/60 |
| 5,299,375 | A | * | 4/1994 | Thummel et al. | 42/115 |
| 5,471,777 | A | * | 12/1995 | McDonald | 42/132 |
| 5,590,951 | A | * | 1/1997 | Matthews | 362/205 |
| 5,629,105 | A | * | 5/1997 | Matthews | 429/97 |
| 5,836,672 | A | * | 11/1998 | Maglica et al. | 362/183 |

FOREIGN PATENT DOCUMENTS

| | | |
|---|---|---|
| DE | 1 736 663 | * 12/1956 |
| DE | 1736669 | * 12/1956 |

OTHER PUBLICATIONS

Extended Range Flashlights catalog sheets dated Dec. 1, 1997 by Laser Products.*

* cited by examiner

*Primary Examiner*—Michael A. Friedhofer

(57) ABSTRACT

An electric appliance includes a first electric power supply of first batteries arranged in a first pattern, and alternatively a different second electric power supply of second batteries arranged in a second pattern. An electrical ON-OFF switch has an ON-OFF position push-button switch actuator and a rotary switch actuator which releasably blocks that ON-OFF position push-button switch actuator in an OFF position. A tail end is equipped with a bistable OFF and ON switching function and with a momentary ON switching function unified into one electric toggle switch having a stable OFF position, a stable ON position, and a momentary ON position. A flashlight beam is cast with a first lamp and reflector assembly, an alternative second lamp and reflector assembly is substituted for that first lamp and reflector assembly and a second light beam of a different configuration is cast with that alternative second lamp and reflector assembly.

16 Claims, 5 Drawing Sheets

BATTERY OPERATED APPLIANCE, FLASHLIGHT AND SWITCHING SYSTEMS

Matter enclosed in heavy brackets [ ] appears in the original patent but forms no part of this reissue specification; matter printed in italics indicates the additions made by reissue.

CROSS-REFERENCE

This is a division of Patent Application Serial No. 08/985,556, filed Dec. 5, 1997 by the subject inventors, issued Apr. 4, 2000, as U.S. Pat. No. 6,046,572, assigned to the herein assignee, and herewith incorporated by reference herein.

TECHNICAL FIELD

The subject invention relates to battery operated appliance, flashlight and switching systems.

BACKGROUND

Even though battery operated appliances and flashlights and electric switches go back to the nineteenth century, there is room for improvement, as this disclosure will show.

SUMMARY OF THE INVENTION

It is a general object of the invention to provide improved battery operated appliances.

It is a germane object of the invention to provide improved power supply systems for battery operated appliances.

It is a related object of the invention to provide improved flashlight systems.

It is also an object of the invention to provide improved electric switches.

Other objects of the invention become apparent in the further course of this disclosure.

The invention resides also in a method of operating an electrical ON-OFF switch having an ON-OFF position push-button switch actuator and a rotary switch actuator, and, more specifically, resides in the improvement comprising, in combination, effecting electrical ON and OFF switching with the rotary switch actuator, rotating that rotary switch actuator past an OFF switching rotary motion to a further OFF position, and releasably blocking the ON-OFF position push-button switch actuator in an OFF position with that rotary switch actuator in that further OFF position of that rotary switch actuator.

From a related aspect thereof, the invention resides in an electrical ON-OFF switch having an ON-OFF position push-button switch actuator and a rotary switch actuator, and, more specifically, resides in the improvement comprising a rotary motion-to-translatory motion translator in said rotary switch actuator, and a releasable specifically, resides in the improvement comprising a rotary motion-to-translatory motion translator in said rotary switch actuator, and a releasable ON position blocker extending from the rotary switch actuator to the ON-OFF position push-button switch actuator and blocking the push-button switch actuator in an OFF position with the rotary motion-to-translatory motion translator and including said rotary motion-to-translatory motion translator.

The invention resides also in a method of providing an electric light source having a housing including a tail end with a bistable OFF and ON switching function and with a momentary ON switching function for said electric light source, and, more specifically, resides in the improvement comprising, in combination, unifying the bistable OFF and ON switching function and the momentary ON switching function into one electric toggle switch having an external switch actuating lever having a stable first position in which the electric light source is OFF, a stable second position in which the electric light source is ON, and a momentary third position biased toward the first position so that the electric light source is momentarily ON only as long as the external switch actuating lever is manually held in the third position against the biasing toward the first position, forming in a side of the tail end a recess having a side wall for laterally protecting the external switch actuating lever against accidental interference, and mounting the electric toggle switch in the tail end inside that recess so that such side wall protects the actuating lever against accidental interference.

From a related aspect thereof, the invention resides in an electric light source having a housing including a tail end, and, more specifically, resides in the improvement, comprising, in combination, a recess in a side of that tail end, and a toggle switch mounted in the tail end inside of that recess and having an external switch actuating lever in that recess having a stable first position in which the electric light source is OFF, a stable second position in which the electric light source is ON, and a momentary third position biased toward first position so that the electric light source is momentarily ON only as long as the external switch actuating lever is manually held in its third position against the bias toward its first position.

The invention resides also in various combinations of these aspects. By way of example, the invention resides also in a method of casting a light beam with a flashlight, comprising, in combination with other aspects of the invention herein disclosed, casting a first light beam with a first lamp and reflector assembly, removing that first lamp and reflector assembly and substituting therefor an alternative second lamp and reflector assembly, and alternatively casting a second light beam of a different configuration with that alternative second lamp and reflector assembly.

The invention similarly resides in a flashlight, comprising, in combination with other aspects of the invention herein disclosed, a first light-beam-casting lamp and reflector assembly, a different light-beam-casting second lamp and reflector assembly, and a common receptacle in the flashlight for the first light-beam-casting lamp and reflector assembly and alternatively for the second lamp and reflector assembly.

BRIEF DESCRIPTION OF THE DRAWINGS

The subject invention and its various aspects and objects will become more readily apparent from the following detailed description of preferred embodiments thereof, illustrated by way of example in the accompanying drawings which also constitute a written description of the invention, wherein like reference numerals designate like or equivalent parts, and in which.

MODES OF CARRYING OUT THE INVENTION

Figure 1:
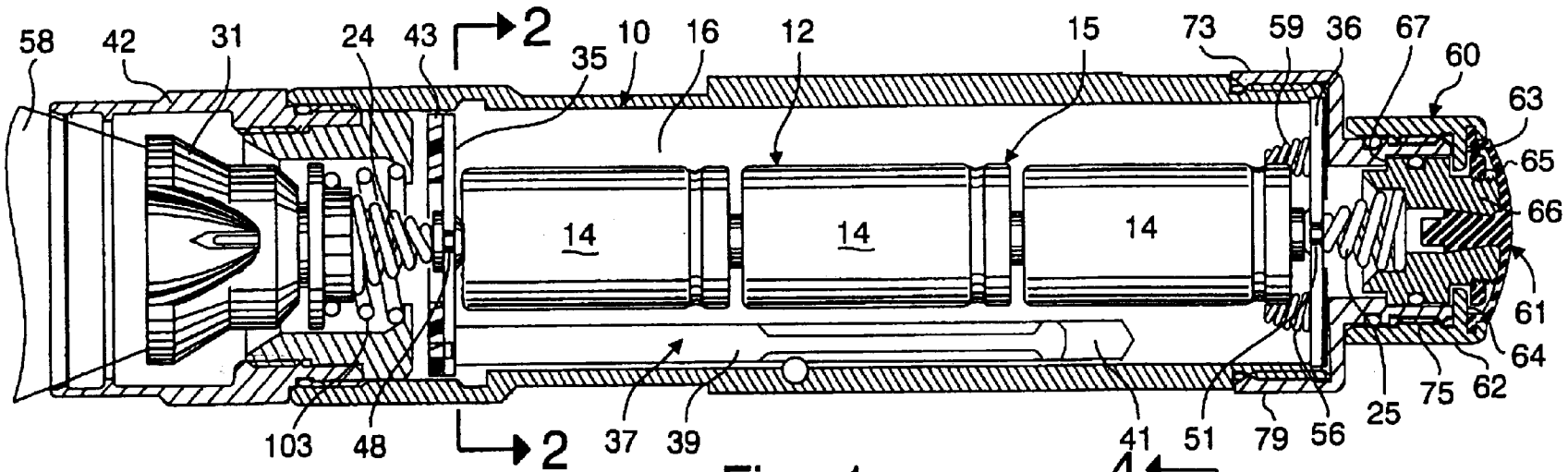
FIG. 1 is a longitudinal section through a flashlight according to an embodiment of the invention.

The drawings show methods and apparatus according to embodiments of the invention.

From one aspect thereof, the drawings show a method of providing an electric appliance 10 with first and second electric power supplies 12 and 13, such as seen in FIGS. 1 to 4.

This method according to an embodiment of the invention arranges first batteries 14 of a first type in a first pattern 15 inside a space 16 in the appliance 10, and establishes a first electric power supply 12 with such first batteries 14 arranged in their first pattern 15.

Figure 3:
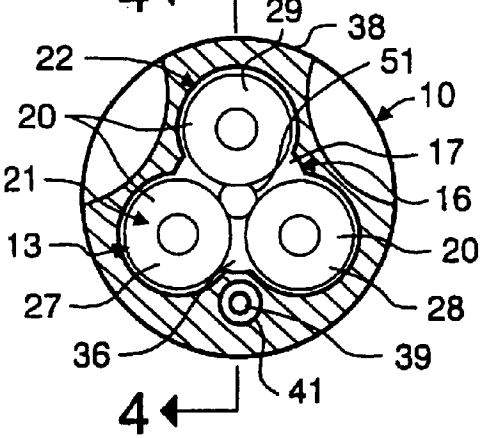
FIG. 3 is a section similar to FIG. 2 but with different batteries according to an embodiment of the invention.
Figure 4:
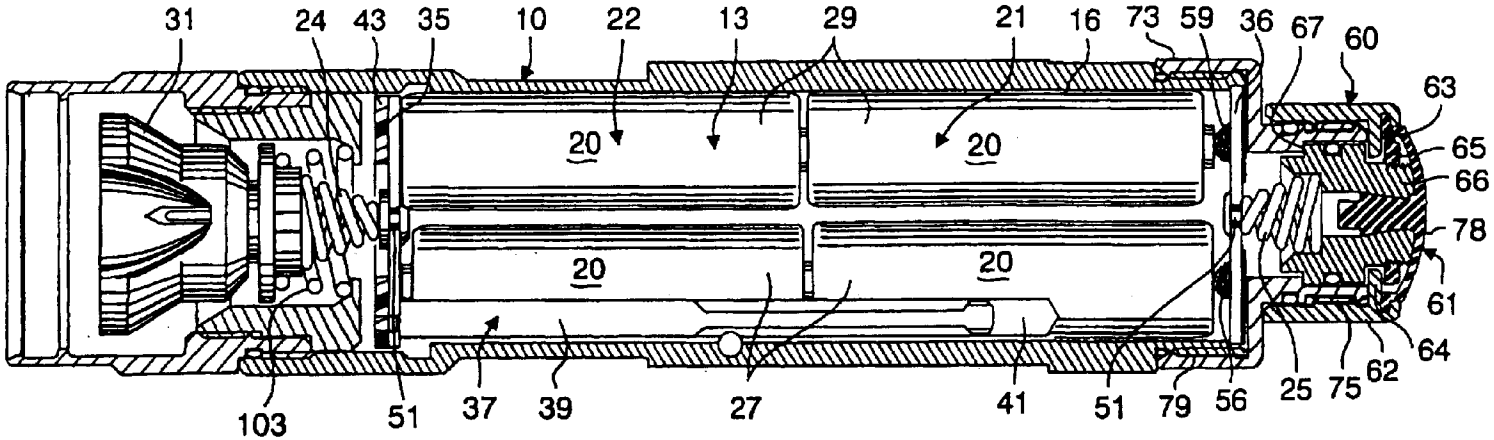
FIG. 4 is a view similar to FIG. 1 after a section taken on the line 4-4 in FIG. 3.

The first batteries 14 may at any time be removed from the space 16 in the appliance 10, and second batteries 20 of a different second type are arranged in a different second pattern 21 inside the space 16 in the appliance 10 and a different second electric power supply 22 is established with such second batteries 20 arranged in their second pattern 21 pursuant to the illustrated embodiment of the invention as seen in FIGS. 3 and 4 and as more fully disclosed below.

A standard dictionary definition of the term battery in electrical terminology is "(1) a group of two or more cells connected together to furnish electric current, (2) a single voltaic cell." In the same manner, The New IEEE Standard Dictionary of Electrical and Electronics Terms, published by The Institute of Electrical and Electronics Engineers (Fifth Edition, 1993), provides the following definition:

"battery (primary or secondary). Two or more cells electrically connected for producing electric energy.

[Common usage permits this designation to be applied also to a single cell used independently. In this document, IEEE Std 100, unless otherwise specified, the term 'battery' will be used in this dual sense.]"

The subject disclosure and accompanying claims similarly use the term battery to refer not only in the ancient sense to a combination of two or more primary or secondary cells, but to refer alternatively to a single cell as well, such as any one cell or battery 14 and/or any one cell or battery 20, herein simply called "battery," whether it consists of one, two or more elements or cells.

Numerous variations are within the scope of the invention. According to one such variation, the second batteries 20 are selected and arranged in their second pattern 21 to provide the second electric power supply 13 with an output voltage substantially equal to an output voltage of the first electric power supply 12, such as between main terminals 24 and 25 as more fully disclosed below.

For optimum design and utility, the second batteries 20 may be arranged so that their second pattern 21 has an overall length substantially equal to an overall length of the first pattern 15, such as seen in FIGS. 1 and 4.

Such design may be further optimized and rendered more versatile by arranging the second batteries 20 in parallel groups of 27, 28 and 29 of which each is substantially equal in length to a length of the first pattern 15. This is illustrated by way of example in FIGS. 3 and 4, showing a first group 27 composed of a first pair of batteries 20, a second group 28 composed of a second pair of batteries 20, and a third group 29 composed of a third pair of batteries 20. In the section of FIG. 4, the second pair of batteries 20 of the second group 28 would look like the first or third pair of batteries 20 in the group 27 or 29, although only one battery 20 of that second group is visible in the section of FIG. 3. Such parallel groups 27, 28 and 29 of second batteries 20 may have an overall voltage substantially equal to an overall voltage of the first batteries 14 arranged in the first pattern 15.

According to the embodiment shown in FIGS. 1 to 4, the batteries 14 and 20 of different first and second types have different lengths. By way of example, the first batteries 14 are selected from a kind of battery having a length that is a fraction of a length of a battery of the second type. Preferably, a first number of the first batteries 14 in first pattern 15 is selected to be substantially equal to a denominator of such fraction, the second batteries 20 are arranged in parallel groups of 27, 28 and 29 of which each is substantially equal in length to a length of the first pattern 15, and a second number of the second batteries 20 in each of such parallel groups 27, 28 and 29 is selected to be substantially equal to a numerator of said fraction.

The second batteries 20 preferably are selected to be substantially equal in number to the aforesaid first number multiplied by a ratio of an output voltage of each of the first batteries 14 to an output voltage of each of the second batteries 20.

These embodiments will now be illustrated by a couple of practical examples. For instance, each first battery may be a kind of battery that has a length that is two-thirds the length of each second battery 20. In the illustrated embodiment, the fraction therefore is $\frac{2}{3}$, with "2" being the numerator and "3" being the denominator of that fraction. Accordingly, FIG. 1 shows three (3) batteries 14 of the first type, which is equal to the denominator of two-thirds, with the above mentioned first number thus being three. Conversely, the embodiment according to FIGS. 3 and 4 includes in each group 27, 28 and 29 of second batteries 20 two (2) of such second batteries of the second type, which is equal to the number of two-thirds, with the above mentioned second number thus being two.

Since three times two-thirds is equal to two, it follows that the second pattern 21 of batteries 20 as arranged according to FIG. 3 and 4 has an overall length substantially equal to an overall length of the first pattern 15 of first batteries 14. In this embodiment, each pair of second batteries 20 in any group 27, 28 or 29 has essentially the same overall length as the three first batteries 14 in the first pattern 15 seen in FIGS. 1 and 4. In practice, this conveniently permits the second kind of batteries 20 to be readily substituted for the first kind of batteries 14, and such first kind of batteries 14 to be readily substituted back for the second kind of batteries 20 without any lengthwise or other adjustment or rearrangement of the appliance 10.

By way of example, each of the batteries 14 of the first type may have an output voltage of three volts, and each of the batteries 20 of the second type may have an output voltage of one and one-half volts. Such output voltage of one and one-half volts is the traditional single-cell voltage of carbon/zinc batteries and their modern successors, culminating in the alkaline battery.

An output voltage of three volts is easily realized by combining two such cells in series into one battery. However, modern lithium batteries have three-volt cells. Accordingly, either three-volt batteries of the traditional kind or three-volt lithium batteries may be employed at 14. In this respect, lithium batteries are preferred at 14, since they are readily available in their three-volt version. However, the alternative accommodation of one and one-half volt batteries such as at 20 in FIGS. 3 and 4, is equally advantageous in practice, since the supply of such traditional one and one-half volt batteries is much more prevalent than the supply of modern three-volt lithium batteries. Accordingly, if the user of the appliance 10 should be at an outpost or other remote location where lithium batteries are not available or have run out, he or she may nonetheless continue to operate the appliance with the more readily available one and one-half volt batteries 20.

In that case, operation of the appliance 10 can continue without exchange or alteration of the load 31, since the parallel groups 27, 28 and 29 of second batteries 20 preferably are arranged in the second pattern 21 to have an overall voltage substantially equal to an overall voltage of the first batteries 14. In this respect, each pair of second batteries 20 in any group 27, 28 or 29 then has an overall voltage of two times one and one-half volts, being three volts, which is equal to the voltage of each first battery 14 in our current example. Accordingly, a series connection of the batteries 20 in the three groups 27, 28 and 29 provides an output voltage of nine volts for the second power supply 13, which amounts to the same as the nine volt output voltage of the first power supply 12 when composed of the three series-connected first batteries 14.

In this respect, the above mentioned first number of first batteries 14 is equal to three (3) and the output voltage of each such first battery 14 is three volts in our current example. The output voltage of each of the second batteries 20 is one and one-half volts, so that the ratio of the output voltage of each first battery 14 to the output voltage of each second battery is 3 to 1.5, being 2. Multiplying the aforesaid first number of three (3) by that ratio of two (2) we obtain six (6) as the number of series-connected second batteries 20.

Since modern lithium batteries are very powerful and therefore preferred, they can readily be substituted without lengthwise or similar adjustment of the appliance and without change of the load 31, as soon as their supply resumes.

By way of example, the load 31 may be a flashlight bulb, such as a nine-volt lamp in our current example, but the invention is neither limited to lamps nor to flashlights, but has utility with other apparatus or appliances and loads.

By way of further example, two-volt batteries may be employed in the appliance 10. Familiar two-volt batteries include lead-acid batteries, preferably of the maintenance free coiled or cylindrical type. For instance, if the first batteries 14 are two-volt lead-acid batteries, then the overall voltage of their first pattern 15 or power supply 12 at terminals 24 and 25 is six volts. In that case, a like voltage may be realized in the appliance 10 by two series-connected groups 27 and 28 of batteries 20, with each of such groups comprising a pair of one and one-half volt batteries. Overall lengths are again the same, if the length of each lead-acid battery 14 is two-thirds of the length of each one and one-half volt battery 20.

By way of further example, if the length of each one and one-half volt second battery 20 is equal to three-quarters of the length of each first battery 14, then a power supply voltage of six volts can be realized at equal lengths among patterns 15 and 21 with three batteries 14 of a two-volt type, and four batteries 20 of a one and one-half volt type.

Carbon-zinc, manganese, alkaline, and lithium batteries are known as primary batteries. Secondary batteries include the above mentioned lead-acid battery and nickel-cadmium and other rechargeable batteries, all of which may be employed in the practice of the subject invention.

Figure 6:
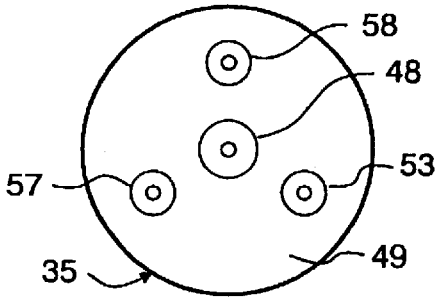
FIGS. 6 and 7 are front and rear views of a contact plate useful in the embodiments of FIGS. 1 to 5.
Figure 7:
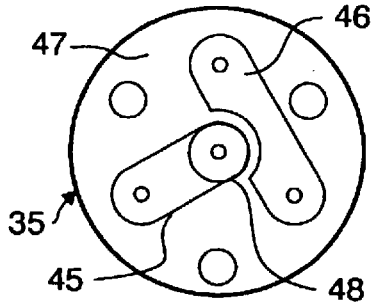

In apparatus terms, FIGS. 1 to 4 show an example of an electric appliance 10 for operation with alternative first and second electric power supplies 12 and 13 comprised of first batteries 14 of a first type and second batteries 20 of a different second type, respectively. Such appliance has a first battery compartment 17 in the appliance adapted to accommodate the first batteries 14 in a first pattern 15 inside a space in that appliance. First circuitry, such as shown at 45, 46, 48, 53, 57 and 58 in FIGS. 6 and 7, is designed or adapted to interconnect the first batteries 14 as the first electric power supply 12. A second battery compartment 16 in the space inside the appliance is designed or adapted to accommodate different second batteries 20 in a different second pattern 21 inside that space in appliance 10. Second circuitry, such as shown at 51, 54, 56 and 59 in FIGS. 1 to 4 and as described below by reference to FIGS. 6 and 7, may be designed or adapted to interconnect the different second batteries 20 as a second electric power supply.

According to a preferred embodiment of the invention, the first and second battery compartments 17 and 16 have substantially equal lengths, but preferably have different widths.

In the illustrated embodiment, the first batteries 14 are electrically connected in series for establishing the first electric power supply 12 in their first pattern 15. Alternatively, the second batteries 20 may be electrically connected in series for establishing the second electric power supply 13 in their pattern 21, especially if the overall or output voltage of the second power supply 13 is to be equal to that of the first power supply 12.

Various switching devices and circuits are known for connecting batteries in series or for that matter in parallel or in any combination of series and parallel connection. FIGS. 1 to 7 show a device for effecting such alternative series connections.

In particular, a first contact plate 35 is shown in FIGS. 1, and 4 to 7 for connecting a first battery 14 of the series of first batteries 14 to the terminal 24 after such first batteries have been installed in the appliance. Such first contact plate 35 is also designed to connect second batteries 20 in series with each other and with the load 31 through the terminal 24. A corresponding second contact plate 36 at the other end of the battery compartment 16 connects series-connected first batteries 14 to the switch terminal 25, and alternatively connects second batteries 20 in series with each other and with the switch terminal 25.

The first contact plate 35 may be moveable relative a remainder of the appliance 10. By way of example, the first contact plate 35 may be located on a retainer 37 that releasably retains such contact plate at a housing 38 of the appliance. By way of example, the retainer 37 may comprise rod 39 which, in turn, may be axially moveable in a corresponding bore 41 at the space 16 in the housing 38 of the appliance 10.

In this manner the contact plate 35 may be swung out of the way and batteries may be inserted into, and may be removed from, the space or battery compartment 16 through the top after temporary removal of the load or lamp assembly 42 therefrom. After completion of such an operation, the contact plate 35 may be swung back into position, such as shown in FIGS. 1 and 4.

FIGS. 6 and 7 show rear and front views of the contact plate 35. A "front view" in this respect is the view as seen from the battery compartment 16. A "rear view" is a view of the opposite side of the contact plate 35, such as after removal of the insulating cover disc 43 therefrom. It may be noted that the orientation of the rear view of FIG. 7 agrees with the orientation of FIG. 3, but that front view of FIG. 6 has been swung around the vertical so as to show it in the drawings.

Electrically conducting bars 45 and 46 are arranged on the rear side 47 of the contact disc 35 in order to connect batteries 20 in series, for example. A central contact 48 extends from the front side 49 through the disc 35 and electrically conducting bar 45 to and through the rear side 47. The other contact disc 36 may have a similar corresponding central contact 51.

Figure 2:
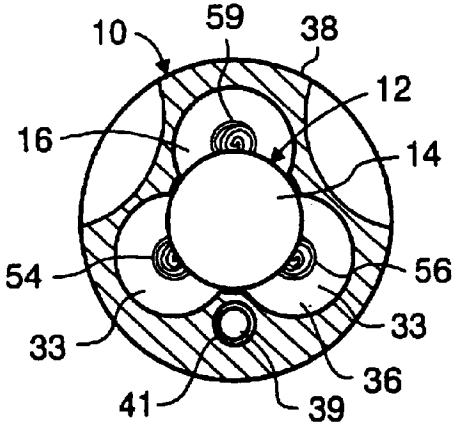
FIG. 2 is a traverse section taken on the line 2-2 in FIG.

In the embodiment of FIGS. 1 and 2, batteries 14 extend in series between the corresponding central contacts 48 and 51 which, in turn, are contacted by contact springs or other main terminals 24 and 25, respectively. Electrically conducting bars of the type shown in FIG. 6 at 45 and 46 are needed in other embodiments, such as shown in FIGS. 3 and 4, or in an embodiment that unifies the features of FIGS. 1 to 4, for instance.

For example, considering an electric supply circuit from the point of view of main terminal 24, it is seen that such circuit extends through central contact 48 and conducting bar 45 to a contact 53 that is connected to that bar 45 through disc 35. Batteries 20 of the first group 27 are connected in series between that contact 53 and an opposite corresponding contact 54 on the opposite contact disc 36, seen only in FIGS. 2 and 4.

An electrically conducting bar (not shown) similar to the contact bar 46 extends in second disc 36 between contact 54 and another contact 56 thereon, seen only in FIG. 2 because of the sectioning of FIG. 4. Batteries 20 of the second group 28 are connected between that contact 56 and another contact 57 on the contact disc 35. That contact 57, in turn, is connected to one end of conducting bar 46 which, in turn, extends and has another end connected to a further contact 58 on the disc 35.

Batteries 20 of the third battery group 29 are connected in series between that further contact 58 and an opposite contact 59 on second contact disc 36. An electrically conducting bar (not shown) similar to bar 45 extends between that contact 59 and central contact 51 on contact disc 36.

Batteries 20 thus are connected in series between opposite main terminals 24 and 25. However, various other arrangements are within the scope of the invention. By way of example and not by way of limitation, batteries could be connected selectively in parallel and in series to provide different watt hours and different voltages for different needs. Alternatively or additionally, voltage regulating devices could be provided, such as in one of the contact discs 35 and 36, for instance, especially if the batteries are of a nickel-cadmium or other type having varying voltage characteristics during discharge or otherwise.

Variations within the scope of the invention include first batteries 14 electrically connected in series, such as shown in FIGS. 1 and 2, for establishing a first electric power supply 12, and second batteries 20 electrically connected in series, such as shown in FIGS. 3 and 4, for establishing a second electric power supply 13.

However, at least some of the batteries in at least one of the first and second patterns 15 and 21 may be electrically connected in parallel to establish at least one of the first and second electric power supplies.

Also within the scope of the invention, batteries in one of the first and second patterns may be electrically connected in series to establish one of the first and second electric power supplies, and batteries in the other of the first and second patterns may be electrically connected in parallel to establish the other of the first and second electric power supplies.

By way of example, the three pairs 27, 28 and 29 of series-connected batteries 20 may be connected in parallel with each other, simply by making the discs 35 and 36 of electrically conductive material insulated from the body of the appliance 10.

Further within the scope of the invention, the second batteries may be selected and arranged in the second pattern to provide the second electric power supply with an output voltage different from an output voltage of the first electric power supply.

Moreover, the second batteries may be selected and arranged in the second pattern to provide the second electric power supply with an electrical work output different from an electrical work output of the first electric power supply.

According to an embodiment of the invention, such as seen when comparing FIGS. 3 and 4 with FIGS. 1 and 2, the batteries of one of the first and second types 14 and 20 are laterally confined inside the space 16 in a narrower confinement than the other batteries 20 or 14 of the other of such first and second types. For instance, as seen in FIG. 2, the first batteries 14 are laterally confined in a narrower confinement than the second batteries 20 which occupy most of the space 16, as in FIG. 3.

Where the first batteries 14 have a first dimension, and the second batteries 20 have a different second dimension, such first batteries may be accommodated in a first region 17 of the space 16 corresponding to that first dimension, and the second batteries 20 may be accommodated in a second region of that space 16. The region 17 may be a first battery compartment having a first dimension corresponding to the first dimension of the first batteries, and a second battery compartment may have a different second dimension at 16 corresponding to the second dimension of the second batteries. By way of example and not by way of limitation, the first region 17 may be the central region within which the first batteries 14 are accommodated such as seen in FIG. 2, and the second region may be the space 16 within which the second batteries 20 are accommodated such as seen in FIG. 3. If the above mentioned first and second dimensions are different thicknesses or diameters of the first and second batteries 14 and 20, then danger to the load 31 from erroneous insertion of batteries may automatically be prevented. For instance, if the first batteries 14 are thicker than the second batteries 20, then each of the lobes 33 of the space 16 within which the second batteries 20 are accommodated may be made laterally too small for accommodation of the first batteries 14. In this manner, the appliance 10 can be designed so that no user will accidentally load six lithium batteries into the appliance and thereby destroy the bulb or other load 31 with an eighteen-volt supply voltage. Conversely, a user who erroneously loads a pair of second batteries 20 into the central region of the space 16 will readily note such error from the feeble glow or other weak output of the bulb or load 31, and can easily correct such error by loading the second batteries 20 correctly, such as shown in FIGS. 3 and 4. To mention but one of many possible examples, a lithium battery of the type DL123A has a diameter of more than 16 mm, but an alkaline battery Size AA or UM3 has a diameter of not more than 14 mm, so that the two kinds of batteries 14 and 20 can easily be distinguished in their placement in the appliance 10, such as pursuant to FIGS. 2 and 3, respectively.

The first and second regions or battery compartments 17 and 33 where the first and second batteries 14 and 20 are accommodated, respectively, may thus be interconnected through the space 16 inside the appliance 10 without danger to the load 31 through accidental overvoltage from erroneously inserted batteries. This sharing of battery accommodation regions or compartments 17 and 33 is an advantageous space confining feature of the illustrated embodiment of the invention.

Figures 8, 9, 10:
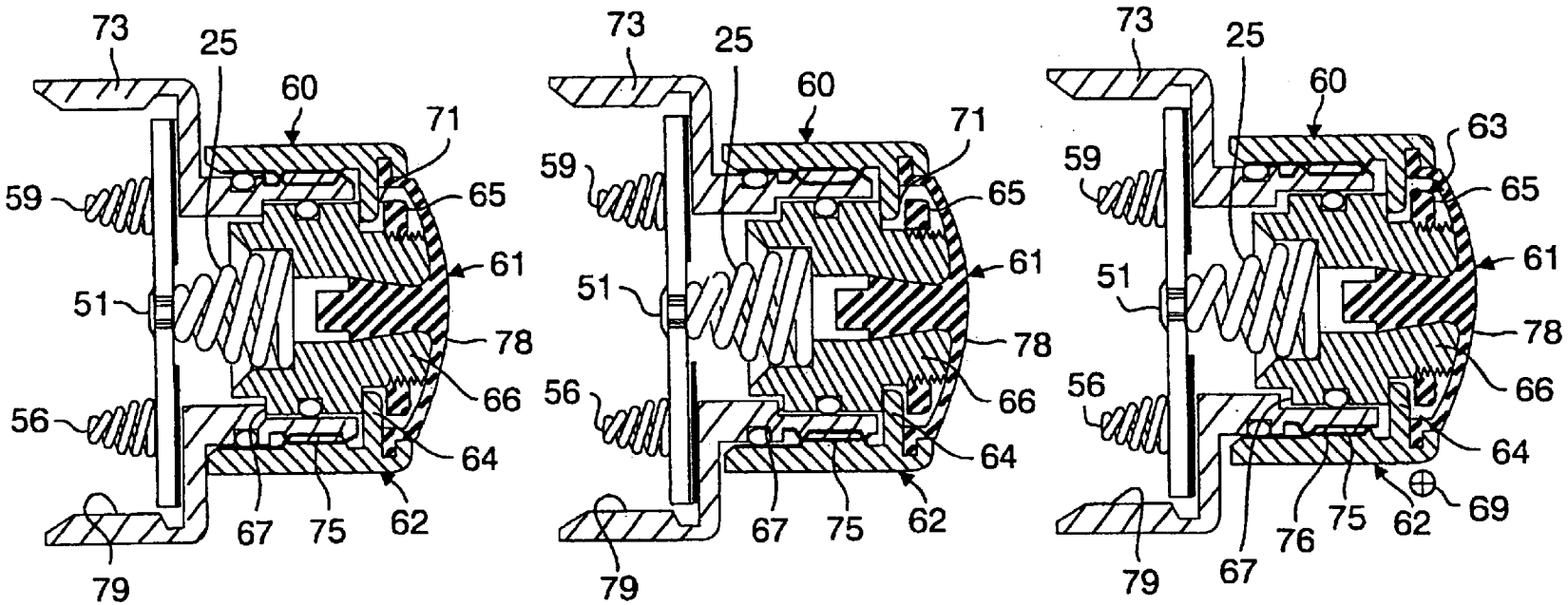
FIGS. 8, 9 and 10 are enlarged longitudinal views of a switch that may, for instance, be used in the flashlight of FIGS. 1 to 5, and illustrate successive closed, unblocked open, and blocked open positions, respectively, according to an embodiment of the invention.

FIGS. 1, 4, 8, 9 and 10 also show an electrical ON-OFF switch 60 for the appliance 10. FIGS. 1, 4 and 8 show such switch in a closed or ON position. FIGS. 9 and 10 show such switch in an open or OFF position. The switch 60 has an ON-OFF position push-button switch actuator 61 and a rotary switch actuator 62. The ON-OFF position push-button switch actuator may be biased to an OFF position, such as by the bias or terminal spring 25. In the position shown in FIG. 9, the actuator 61 is manually actuable against the bias of the spring 25 to the electrical ON position shown in FIG. 8. However, in the position shown in FIG. 10, the ON-OFF position push-button switch actuator 61 is releasably blocked in an OFF position with the rotary switch actuator 62 against actuation to the ON position shown in FIG. 8.

In apparatus terms, the electrical ON-OFF switch 60, having an ON-OFF position push-button switch actuator 61 and a rotary switch actuator 62, includes a releasable ON position blocker 63 extending from that rotary switch actuator 62 to the actuator 61. As shown by way of example in FIG. 10, the blocker 63 blocks the push-button switch 61 against movement to the ON position. In this or any other manner within the scope of the invention, the ON-OFF push-button switch is releasably blocked in an OFF position with the rotary switch actuator. By way of example and not by way of limitation, the illustrated embodiment of the invention shows the blocker 63 in the form of a coupling of two elements, comprising a first blocking element 64 connected to the rotary switch actuator 62 and a second blocking element 65 connected to the push-button switch actuator 61 or directly to the plunger 66 thereof.

In the embodiment shown in FIG. 10, the first blocking element 64 is in a position wherein it blocks the second blocking element 65 so that the push-button switch actuator 61 cannot move from its OFF position to its ON position. The blocker 63 accordingly is an ON position blocker; blocking the push-button type switch 61 against movement to its ON position.

In the embodiment shown in FIGS. 1, 4, 8, 9 and 10, the actuator 61 is equipped with or has a spring-biased switch activating plunger 66 moveable between ON and OFF positions. The releasable ON position blocker 63 is coupled to that switch activating plunger 66. Such plunger may be electrically conductive so as to complete an electric circuit therethrough in its ON position shown in FIGS. 1, 4 and 8. However, this is not a requirement within the broad scope of the invention, since the plunger may otherwise actuate an electric circuit.

By way of example, such an operating plunger that does not conduct the switching current is shown at 127 in FIG. 2 of U.S. Pat. No. 5,590,951, by John W. Matthews, Ph.D., issued Jan. 7, 1997 to Laser Products Ltd., for "Switch-Less Flashlights," hereby incorporated by reference herein.

In particular, that prior-art technology enables rear-end switching of flashlights and the like without an electrical rear-end switch. In that case, delivery of electric power from a battery to a lamp is concentrated at the lamp assembly area, and there need to be no electrical lead or connection from the tail end where the plunger 127 is located to the lamp assembly area. Accordingly, while FIGS. 1, 4, 8, 9 and 10 show switch contacts 67 at the plunger 66, it should be understood that within the scope of the invention, such switch contacts may be separate or may even be remote from the plunger 66, as in the above-referenced U.S. Pat. No. 5,590,951.

In either case, switch contacts are held normally open ["N.O."] by the spring 25 such as in FIG. 9 or by another bias.

Such switch contacts are also locked in an open position, *i.e. the contacts 67 are prevented from closing,* by the manually releasable OFF position lock 63, such as in FIG. 10.

It may be said that the electrical ON-OFF switch 60 is equipped with switching contacts, such as 67, having a normally open ["N.O."] position, such as shown in FIG. 9, and that such switching contacts are releasably blocked in their open position, such as shown in FIG. 10 against actuation to their closed position such as illustrated in FIG. 8.

In apparatus terms, the electrical ON-OFF switch 60 has switching contacts, such as contacts 67, having a normally open ["N.O."] position, such as shown in FIG. 9, and the releasable OFF position lock 63 is coupled to these switching contacts, such as shown in FIG. 10. This is in addition to the alternative closed position, such as shown in FIG. 8.

When locking of the switch actuator 61 or plunger 66 against actuation to the ON position is desired, then the blocker 63 is manually actuated, such as indicated by an arrow rear-end symbol 69 in FIG. 10. The second blocking element 65 is then coupled to the manually actuated first blocking element 64, with [minimum, if any, play therebetween] *the separation between the contacts 67 being greater than the separation 71 between the blocking elements 64 and 65.*

[Conversely, there is play 71 between these blocking elements 64 and 65 not only in the ON position of the switch 60 such as shown in FIG. 8, but also in the unlocked OFF position such as shown in FIG. 9. That play 71 in FIG. 9] *The separation 71 between the blocking elements 64 and 65 in FIG. 9* is sufficiently large *relative to the separation between the contacts 67* to permit actuation of the switch 60 from its unlocked OFF position such as shown in FIG. 9, to its ON position such as shown in FIG. 8 by actuation of the push-button switch 61 through depression of the plunger 66. [There accordingly is more play between the blocking elements 64 and 65 in an ON position and in an unblocked OFF position of the electrical ON-OFF switch, than in an OFF position, such as shown in FIG. 10, blocked by the ON position blocker 63.]

In the embodiment illustrated in FIGS. 1, 4, 8, 9 and 10, the first blocking element 64 is also a switch activator. It may be said in this respect that the rotary switch 62 has a switch activator integral or in one piece with the first blocking element 64. In that case, the rotary switch may operate via the first blocking element 64 and plunger 66 to actuate the switch 60 to its ON position and to releasably retain it in that ON position, such as shown in FIG. 8, where the switch contacts 67 are closed, such as for energization and operation of a load 31 from a power supply 12 or 13.

The switch actuator 61 may be coupled to the rotary switch actuator 62 via the blocker 63 or first and second blocking elements 64 and 65. Such coupling is tight in the embodiment as illustrated in FIG. 8, being in effect a mechanical connection for releasably locking the contacts 67 in a closed position and thereby the switch 60 in its ON position. Such coupling in the embodiment as shown in FIG. 9, is sustained by the bias of the switch terminal spring 25 which in effect couples the actuator 61 or plunger 66 to the first blocking element 64, thereby biasing of the contacts 67 to their normally open ["N.O."] position and thereby of the switch 60 to its OFF position. Such coupling permits actuation of the contacts 67 to their closed position and thereby of the switch 60 to its ON position, such as by operation of the actuator 61 or plunger 66 against the bias of the switch terminal spring 25.

In the embodiment of FIG. 10, the coupling of the plunger 66 to the first blocking element 64 is supplemented by the second or OFF position blocking element 65, that restrains or in effect locks the actuator 61 or plunger 66 in the OFF position of the switch 60 *by preventing the contacts 67 from closing when the second blocking element 65 comes into contact engagement with the first blocking element 64 as the plunger 66 is depressed.*

In the illustrated embodiment of the invention, the electrical ON-OFF switch 60 has a base 73 and the rotary switch actuator 62 is mounted on that base and is connected to the ON position blocker. By way of example, the rotary switch actuator 62 may be integral with the first blocking element 64. Such rotary switch actuator preferably extends over at least part of the base 73 and of the push-button actuator 61, and over the releasable ON position blocker 63.

The switch base 73 may have a cylindrical configuration and the rotary switch actuator 62 may be a manual actuation knob on that base. Such actuation knob or rotary switch actuator 62 may be threaded on the cylindrical switch base 73 by mating threads 75. In this manner, the actuation knob or rotary switch actuator 62 may travel back and forth on the cylindrical base 73, as such actuation knob or rotary switch actuator is manually rotated in the sense of rotation of the symbolically indicated arrow 69 and conversely in the opposite sense of rotation. In this or any other manner within the scope of the invention, manual rotary motion of the actuation knob or rotary switch actuator 62 is translated into translatory motion from the closed switch or ON position shown in FIG. 8 to the unblocked OFF position shown in FIG. 9 and hence to the blocked OFF position shown in FIG. 10, such as by rotation in the direction of arrow 69 past the unblocked OFF position switching rotary motion. As apparent from FIG. 9 to FIG. 10, this translates rotary motion of the rotary switch actuator 62 into translatory motion of that rotary switch actuator past the OFF switching rotary motion in the illustrated embodiment. Accordingly, there is a rotary motion-to-translatory motion translator at 75 in the rotary switch actuator 62, and the releasable ON position blocker 63, which extends from such rotary switch actuator to the ON-OFF position push-button switch actuator 61, in effect includes such rotary motion-to-translatory motion translator. Contrariwise, a converse manual rotation of the actuation knob or rotary switch actuator 62 will translatorily move the assembly 61, 62, 63 from the blocked OFF position shown in FIG. 10 to the unlocked OFF position shown in FIG. 9 and hence to the closed switch or ON position shown in FIG. 8, as desired by the operator or user of the appliance.

It is thus seen that the switch 60 can be blocked against accidental activation by one to two extra turns of the actuation knob or rotary switch activator 62 past the unblocked OFF position shown in FIG. 9 to a further OFF position as shown in FIG. 10 and described above.

Such actuation knob or rotary switch activator 62 and its blocking element 64, as well as the OFF position blocker 63, may at least partly be of electrically insulating material so as to avoid electric current conduction from the spring-biased plunger 66 to the base 73 via the blocking elements 64 and 65. However, where resistance against wear and tear is important, at least the actuation knob or rotary switch actuator 62 and the first blocking element 64 may be made of metal or of another strong, electrically conductive material.

In that case, an electrically insulating layer may be imposed or located between the mating threads 75, such as indicated at 76 near the bottom of FIG. 10. Various techniques, such as anodization in the case of aluminum parts, are available for that purpose. The second blocking element 65 is shown as being of electrically insulating material to prevent inadvertent ON switching of the load 31 in the blocked position of the switch 60, such as shown in FIG. 10.

The switch actuator 61 may include an elastomeric diaphragm 78 connected to the actuation knob or rotary switch actuator 62 and to the plunger 66, and preferably covering the assembly 62, 63 and 64 on one side.

By way of example, the electric switch 60 may be a tail end switch assembly of a flashlight or other appliance 10. In that case, the cylindrical base 73 and an end of the appliance 10 may have mating threads 79.

The blocking feature such as illustrated in the drawings culminating in FIG. 10, is highly useful in practice. For instance, if the appliance 10 is a flashlight or other device stored and transported in knapsacks, duffelbags or other containers, then the blocking feature according to the invention prevents inadvertent closure of the switch 60 through contact of the push-button switch actuator 61 with the other objects in, or with parts of, the bag or other container.

Moreover, if the appliance is for use in deep-sea diving or in other environments where external pressure increases, the blocking feature of the invention prevents undesired actuation of the switch 60 through such increasing pressure.

In these cases, the currently disclosed aspect of the invention prevents useless consumption or discharge of the power source or supply 12 or 13.

Such prevention of accidental energization of the load 31 may also safeguard the user against harm, such as in situations where accidental actuation of the lamp or other energy-emitting load 31 may attract predators or alert enemies.

At the same time, the appliance retains its utility for alternative switching through push-button 61 for momentary light emission or momentary actuation of the load for other purposes, or through rotary switch 62 for longer energizations; all at an instant and without need for extra blocking switches or external caps or other external blocking devices.

Figure 11:
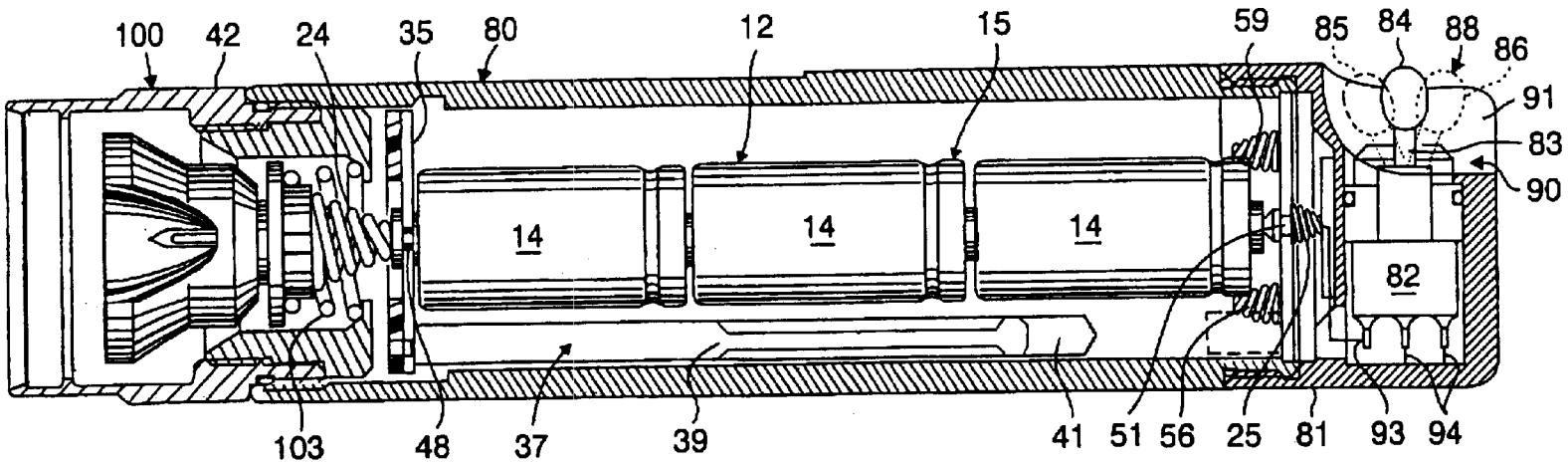
FIG. 11 is a view similar to FIG. 1, but showing a toggle-type tail end switch pursuant to an embodiment of the invention.

FIG. 11 is a view similar to FIG. 1, for instance, but with a different tail end switch. In a broader sense, however, FIG. 11 illustrates embodiments of an electric light source 100, similar to the appliance 10 shown in FIG. 1 and described above, and of a method of providing an electric light source (a) having a housing 80 including a tail end 81 with (b) a bistable OFF and ON switching function and with a momentary ON switching function for that electric light source 100.

This method according to the currently disclosed aspect of the invention unifies such bistable OFF and ON switching function and such momentary ON switching function into one electric toggle switch 82 having an external switch actuating lever 83 having a stable first position 84 in which the electric light source is OFF, a stable second position 85 in which that electric light source is ON, and a momentary third position 86 biased toward the first position 24 so that the electric light source 12 is momentarily ON only as long as the external switch actuating lever 83 is manually held in such third position 86 against its biasing toward the first position 84.

The illustrated embodiment also forms in a side 88 of the tail end 81 a recess 90 having a side wall 91 for laterally protecting the external switch actuating lever 83 against accidental interference.

The currently disclosed embodiment mounts the electric toggle switch 82 in the tail end 81 inside recess 90 so that side wall 91 protects the actuating lever 83 against accidental interference.

Figure 12:
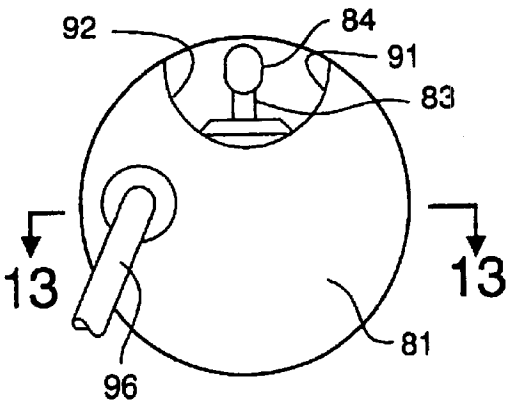
FIG. 12 is an end view of the tail end switch of FIG. 11.

As seen in FIG. 12, recess 90 may be formed with a second side wall 92 for further protecting the external switch actuating lever 83 against accidental interference.

As seen in FIGS. 11 and 12, recess 90 may be formed as a groove open at an end of tail end 81 and the external switch actuating lever 83 may be located in that groove.

While different arrangements of switch positions 84 to 86 are within the scope of the invention, the first position 84 preferably is located between second and third positions 85 and 86, such as shown in FIG. 11.

In the best mode currently contemplated, the second position 85, being the stable ON position, is made to be closer to the light source 100 than the momentary third position 86.

In the embodiment illustrated in FIGS. 11 and 12, the first, second and third positions 84, 85 and 86 advantageously are in a longitudinal plane through the housing 80, such as represented by the plane of the paper on which FIG. 11 is drawn.

In apparatus terms, the currently disclosed aspect of the invention resides in an electric light source 100 having a housing 80 including a tail end 81 having a recess 90 in a side 88 of the tail end 81 and including a toggle switch 82 mounted in that tail end inside of recess 90 and having an external switch actuating lever 83 in that recess having a stable first position 84 in which the electric light source is OFF, a stable second position 85 in which the electric light source is ON, and a momentary third position 86 biased toward the first position 84 so that the electric light source is momentarily ON only as long as the external switch actuating lever 83 is manually held in such third position against its biasing toward the first position 84. Recess 90 may have a side wall adjacent the external switch actuating lever 83. Preferably, such external switch actuating lever 83 is located between side walls 91 and 92 of that recess, such as seen in FIG. 12.

Embodiments of this invention have several advantages over the prior art. Unlike the suggestion by Adolph E. Goldfarb in his U.S. Pat. No. 4,504,889, issued Mar. 12, 1985, to fit a flashlight "with a toggle or slide switch in addition to the momentary switch," the subject invention unifies the momentary switch function with the bistable ON-OFF function for an electric light source into one and the same toggle switch which, as such, may be of conventional design, such as sold for motor controls. Unification of the bistable and momentary switch functions into one 3-position toggle switch improves switchability and performance of the electric light source over prior-art alternatives where the momentary switch was separate from an ON-OFF switch.

Mounting the 3-position toggle switch into the tail end of the electric light source housing adds operational convenience and efficacy for many uses and situations which is lacking in prior-art proposals such as seen in U.S. Pat. No. 3,652,846 by Walter A. Starek, II, issued Mar. 28, 1972, 3,711,699 by Joseph G. Bacevius, issued Jan. 16, 1973, 4,000,403 by Marion D. Rice, issued Dec. 28, 1976, and 4,250,446 by Raymond Ponte, issued Feb. 10, 1981.

Unlike prior-art designs such as seen among the above mentioned patents and also in U.S. Pat. No. 5,299,375 by Thummel et al., issued Apr. 5, 1994, and 5,471,777 by Kenneth E. McDonald, issued Dec. 5, 1995, the subject invention as embodied in FIGS. 13 and 14 protects the 3-way toggle switch against accidental interference which includes a wide variety of accidental actuations of the electric light source from such sources as unintended manual actuation by the user, and interference from other objects, such as in a bag or other container in which the electric light source is packed, or interference from a bag or other enclosure itself, or interference from algae or other objects in underwater operations, to name a few examples.

Toggle switch 82 may be electrically connected to the remainder of the flashlight in any desired manner. By way of example, FIG. 11 shows a lead 93 connecting an input or common terminal of toggle switch 82 to the main terminal 25 of the battery power supply. Output terminals of toggle switch 82 for the stable ON position and for the momentary ON position may be "grounded" such as shown at 94 by connection to an electrically conducting tail end and flashlight body for connection to the load.

An embodiment of the currently disclosed aspect of the invention provides a further switching function or further switch 96 in addition to the toggle switch 82. Such further switching function or switch may be in parallel to such electric toggle switch 82. Such further switching function may be remotely operated. In other words, the further switch may be of a remotely operated kind.

Figure 13:
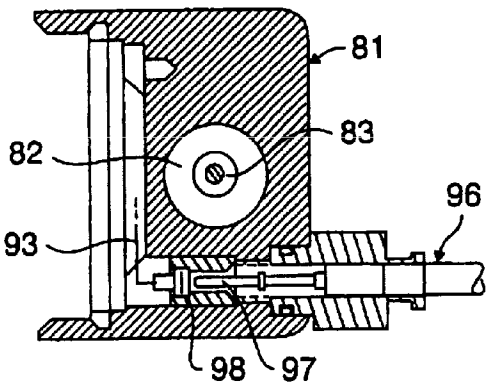
FIG. 13 is a section taken on the line 13-13 in FIG. 12.

By way of example, FIGS. 12 and 13 show part of a cable release switch 96 that may, for instance, be similar to a cable release for photographic cameras, in that a tip 97 of a release cable contacts a part 98 upon actuation of the cable release. In the case of the embodiment of FIGS. 11 to 13, the part 98 may be a contact connected by the electric wire 93 to the main terminal 25 of the battery power supply. The cable tip 97, on the other hand, may be an electric contact that "grounds" that part of the power supply for connection to the load.

In this manner, the user of the flashlight or light source 100 is provided with the convenient alternative of a proximately controlled switch 82 and a remotely controlled switch 96.

Figure 5:
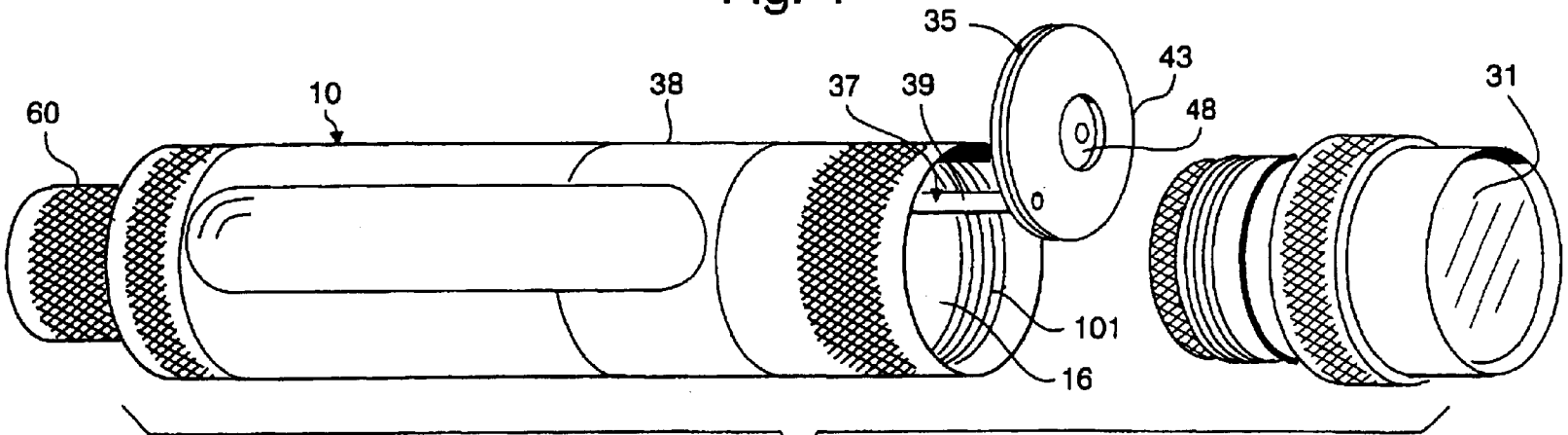
FIG. 5 is a perspective exploded view showing the flashlight of FIGS. 1 to 4 on a reduced scale in a battery loading and unloading condition according to an embodiment of the invention.
Figure 14:
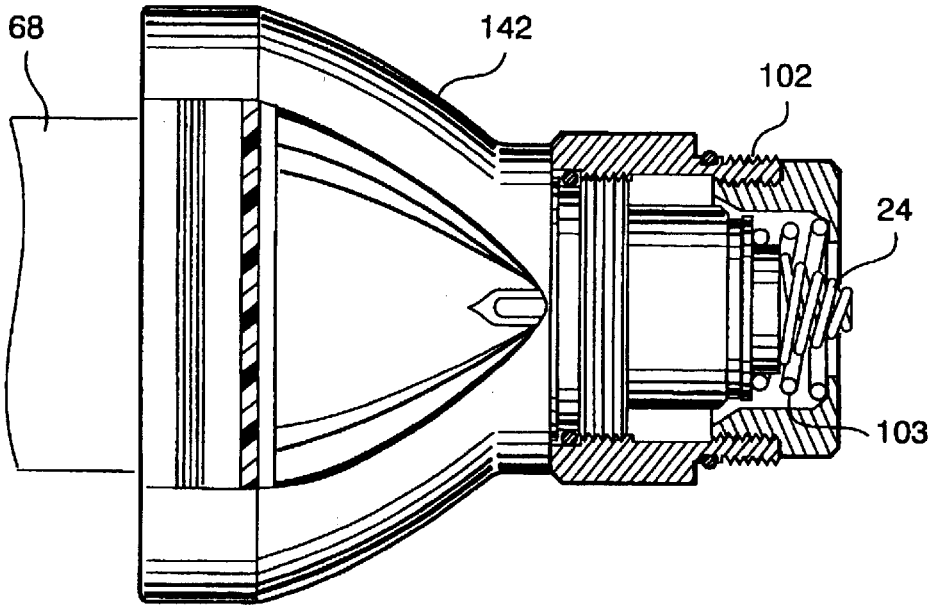
FIG. 14 is a side view, partially in section, of an alternative flashlight head.

A further aspect of the invention uses known flashlight head exchanging technology for providing different flashlight beams in combination with other aspects of the invention. In this respect, FIG. 1 shows the casting of a first light beam 58 with a first lamp and reflector assembly 42. That first lamp and reflector assembly may be removed, such as shown in FIG. 5, illustrating removal of the first lamp and reflector assembly as a unit. An alternative second lamp and reflector assembly 142, such as shown in FIG. 14, may then be substituted therefor, and a second light beam 68 of a different configuration may then be cast with that alternative second lamp and reflector assembly 142. As seen from a comparison of FIGS. 1 and 14, the alternative second lamp and reflector assembly 142 shown in FIG. 14 is different from the first lamp and reflector assembly 42 shown in FIG. 1. In apparatus terms, an illustrated embodiment of the invention comprises, in combination with other aspects of the invention, a first light-beam-casting lamp and reflector assembly 42, a different light-beam-casting a second lamp and reflector assembly 142, and a common receptacle 101 in the flashlight 10 for that first light-beam-casting lamp and reflector assembly and alternatively for that second lamp and reflector assembly. These different assemblies may have like threads 102 for alternatively fitting into a mating thread in the common receptacle 101.

Desired configurations of light beams 58 and 68 may be realized by appropriate dimensioning and relative location of lamp and reflector in each assembly 42 and 142, or by other conventional means. In this manner, a spread light beam 58 may, for example, be cast with the first lamp and reflector assembly 42, and a narrow light beam 68 may alternatively be cast with the alternative second lamp and reflector assembly 142. By way of example, FIG. 1 shows a first lamp housing 42 having a light beam spreading electric light source and reflector assembly for emitting a spread light beam 58. FIG. 14, on the other hand, shows a second lamp housing 142 having a narrow light beam emitting electric light source and reflector assembly. In this respect, "spread" and "narrow" are relative terms, with the second light beam 68 being narrower than the first light beam 58. The lamp housings 42 and 142 may have like spring terminals 24 for a supply of electric battery power to the light source. An additional spring 103 may be provided for shock absorbing purposes. Features of various aspects of the invention may advantageously be combined. For instance, the aspect of the invention disclosed with the aid of FIGS. 5 and 14 may be combined with any of the embodiments shown in the other drawings for such purposes as better selective beam casting and switching.

By way of example, casting of a first light beam, such as beam 58, with a first lamp and reflector assembly 31 may be energized by electric power from one of the first and second electric power supplies 12 and 13, and alternative casting of a second light beam, such as beam 68, with an alternative second lamp and reflector assembly 142 may be energized by electric power from one of such first and second electric power supplies.

In this manner, different light beams may, for instance, may be energized from different electric power supplies, if desired, and different lamp and reflector assemblies may be provided and used for different electric power supplies. Different light-beam-casting lamp and reflector assemblies, such as 31 and 142, may be combined with the above mentioned toggle switch system 88 for greater versatility. Another combination within the scope of the invention in a flashlight may comprise in combination a first light-beam-casting lamp and reflector assembly 31, a different light-beam-casting second lamp and reflector assembly 142, a common receptacle 101 for the first light-beam-casting lamp and reflector assembly and alternatively for the second lamp and reflector assembly, an electrical ON-OFF switch 60 for a lamp in either of such first and second lamp and reflector assemblies, an ON-OFF position push-button switch actuator 61 and a rotary switch actuator 62 in that electrical ON-OFF switch, and a releasable ON position blocker 63 extending from the rotary switch actuator to the ON-OF position push-button switch actuator. Such electrical ON-OFF switch then is a switch for the lamp in either of the first and second lamp and reflector assemblies.

We claim:

1. In a method of operating an electrical ON-OFF switch having an ON-OFF position push-button switch actuator and a rotary switch actuator, the improvement comprising in combination:

effecting electrical ON and OFF switching with said rotary switch actuator rotating said rotary switch actuator past an OFF switching rotary motion to a further OFF position, and releasably blocking said ON-OFF position push-button switch actuator in an OFF position with said rotary switch actuator in said further OFF [portion] *position* of said rotary switch actuator.

2. A method as in claim 1, wherein:

said electrical ON-OFF switch is equipped with switching contacts having a normally open position; and said switching contacts are releasably blocked in said open position by rotating said rotary switch actuator past an OFF switching rotary motion and translating rotary motion of said rotary switch actuator into translatory motion of said rotary switch actuator part said OFF switching rotary motion.

3. A method as in claim 1, wherein:

said push-button switch actuator is equipped with a switch actuating plunger moveable between ON and OFF positions; and said switch actuating plunger is releasably blocked in said OFF position against actuation to said ON position by rotating said rotary switch actuator past said OFF switching rotary motion and translating rotary motion of said rotary switch actuator into translatory motion of said rotary switch actuator past said OFF switching rotary motion.

4. In an electrical ON-OFF switch having an ON-OFF position push-button switch actuator and a rotary switch actuator, the improvement comprising:

a rotary motion-to-translatory motion translator in said rotary switch actuator; and a releasable ON position blocker extending from said rotary switch actuator to said ON-OFF position push-button switch actuator and blocking said push-button switch actuator in an OFF position with said rotary motion-to-translatory motion translator.

5. An electrical ON-OFF switch as in claim 4, wherein:

said releasable blocker includes a coupling of blocking elements between said rotary switch actuator and said push-button switch actuator of said electrical ON-OFF switch.

[6. An electrical ON-OFF switch as in claim 5, including:

more play between said blocking elements in an ON position and in an unblocked OFF position of said electrical ON-OFF switch, than in an OFF position blocked by said ON position blocker.]

7. An electrical ON-OFF switch as in claim 4, wherein:

said releasable blocker includes a first blocking element connected to said rotary switch actuator and a second blocking element connected to the push-button switch actuator.

8. An electrical ON-OFF switch as in claim 7, wherein:

said rotary switch actuator has a switch activator integral with said first blocking element.

9. An electrical ON-OFF switch as in claim 4, wherein:

said electrical ON-OF switch has switching contacts having a normally open position and an alternative closed position; and said releasable ON position blocker is coupled to said switching contacts.

10. An electrical ON-OFF switch as in claim 4, wherein:

said push-button switch actuator has a switch actuating plunger moveable between ON and OFF positions; and said releasable ON position blocker is coupled to said switch actuating plunger.

11. An electrical ON-OFF switch as in claim 10, wherein:

said releasable blocker includes a first blocking element connected to said rotary switch actuator and a second blocking element connected to said switch actuating plunger.

12. An electrical ON-OFF switch as in claim 4, wherein:

said rotary switch actuator is mounted on a base and is connected to said ON position blocker.

13. An electrical ON-OFF switch as in claim 12, wherein:

said base has a cylindrical configuration; and said rotary switch actuator is a manual actuation knob on said base threaded on said base by mating threads.

14. An electrical ON-OFF switch as in claim 12, wherein:

said rotary switch actuator extends over at least part of said base and of said push-button switch actuator, and over said rotary motion-to-translatory motion translator and releasable ON position blocker.

15. In combination with an electrical ON-OFF switch as in claim 4, a first light-beam-casting lamp and reflector assembly;

a different light-beam-casting second lamp and reflector assembly; and a common receptacle for the first light-beam-casting lamp and reflector assembly and alternatively for the second lamp and reflector assembly;

said electrical ON-OFF switch being a switch for a lamp in either of the first and second lamp and reflector assemblies.

16. A flashlight as in claim 15, wherein:

said first light-beam-casting lamp and reflector assembly includes means for spreading said first light beam.

17. A flashlight as in claim 15, wherein:

said second lamp and reflector assembly includes means for narrowing said first light beam.

* * * * *